United States Patent [19]

Staiger

[11] 4,224,183

[45] Sep. 23, 1980

[54] PREPARATION OF A TITANIUM COMPONENT FOR POLYMERIZATION CATALYSTS OF THE ZIEGLER-NATTA TYPE

[75] Inventor: Gerhard Staiger, Bobenheim-Roxheim, Fed. Rep. of Germany

[73] Assignee: BASF Aktiengesellschaft, Fed. Rep. of Germany

[21] Appl. No.: 54,864

[22] Filed: Jul. 5, 1979

[30] Foreign Application Priority Data

Jul. 14, 1978 [DE] Fed. Rep. of Germany ....... 2830929

[51] Int. Cl.² .............................................. C08F 4/64
[52] U.S. Cl. ................................ 252/429 B; 526/144
[58] Field of Search ..................................... 252/429 B

[56] References Cited

U.S. PATENT DOCUMENTS

| | | | |
|---|---|---|---|
| 3,560,146 | 2/1971 | Luciani et al. | 252/429 B X |
| 4,079,175 | 3/1978 | Tokunaga et al. | 252/429 B X |
| 4,168,361 | 9/1979 | Oda et al. | 252/429 B X |

*Primary Examiner*—Patrick Garvin
*Attorney, Agent, or Firm*—Keil & Witherspoon

[57] ABSTRACT

A special process for the preparation of a titanium component for polymerization catalysts of the Ziegler-Natta type, wherein (1) in a first stage (1.1) an alcoholate of the formula $Mr(OR)_2$, where R is lower alkyl and (1.2) a chlorotoluene of the formula

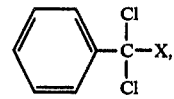

where X is chlorine or hydrogen, are milled together in a particular molar ratio in a vibratory ball mill under particular milling conditions, especially a relatively low temperature, in the absence of a diluent, thereafter (2) in a second stage (2.1) the material resulting from stage (1) is brought together with (2.2) titanium tetrachloride in a particular ratio, the batch is kept for some time at an elevated temperature, with constant mixing, and the resulting solid is isolated, excess titanium tetrachloride being separated off, and finally (3) in a third stage (3.1) the solid resulting from stage (2) is again brought together with (3.2) titanium tetrachloride in a particular ratio, the batch is again kept for some time at an elevated temperature, with constant mixing, and the resulting solid, constituting the novel titanium component, is isolated, excess titanium tetrachloride being removed. The novel titanium compound permits the production of polymers of α-monoolefins not only in high yield but also with high isotacticity.

1 Claim, No Drawings

PREPARATION OF A TITANIUM COMPONENT FOR POLYMERIZATION CATALYSTS OF THE ZIEGLER-NATTA TYPE

Titanium components for polymerization catalysts of the Ziegler-Natta type are known in a large number of variants, especially those where the titanium component is of a particular chemical and/or physico-chemical nature.

Modifications of the nature of the titanium component are made to achieve particular objectives, for example the following:

(a) Catalysts which on polymerization of α-mono-olefins, especially propylene, give polymers with a relatively high proportion of stereo-regular (=isotactic) polymers.

(b) Catalysts which can give an increased yield of polymer, namely catalysts of increased productivity, ie. catalysts where the amount of polymer formed per unit weight of titanium component is increased.

(c) Catalysts which introduce less halogen, or no halogen at all, into the polymer, which is achievable by increasing the yield according to (b) and/or by employing a titanium component which contains very little or no halogen.

(d) Catalysts which display their advantageous effects even at relatively low temperatures, which can be important, for example, for dry-phase polymerization.

(e) Catalysts which influence the morphological properties of the polymers in a particular way, for example in giving a uniform particle size and/or a high bulk density; these factors may for example be significant in respect of technical control of the polymerization system, of working up of the polymers and/or of processability of the polymers.

(f) Catalysts which are simple and safe to prepare and easy to handle, for example catalysts which can be prepared in (inert) hydrocarbon auxiliary media.

(g) Catalysts which make it possible, where the polymerization is carried out in the presence of a molecular weight regulator, especially hydrogen, to manage with relatively small amounts of regulator; this can be significant, for example, in respect of the thermodynamics of the process.

(h) Catalysts especially suitable for particular polymerization processes, for example catalysts which are suited to the specific peculiarities of suspension polymerization or the specific peculiarities of dry-phase polymerization.

(i) Catalysts which give polymers having a pattern of properties which makes them particularly suitable for one or other field of use.

Experience to date has shown that amongst the various objectives there are some which can only be achieved by modifying the nature of the titanium component if other objectives are lowered.

Under these circumstances it is in general desirable to find modifications which not only achieve the particular objectives but also demand minimum lowering of other desirable objectives.

It is an object of the present invention to provide a novel type of titanium component by means of which better results can be achieved—for similar objectives—than with conventional titanium components.

We have found that this object is achieved with a titanium component which is a product, obtained in a particular manner, and especially under particular thermal conditions, from a particular magnesium alcoholate, a particular chlorotoluene and titanium tetrachloride.

Accordingly, the present invention relates to a process for the preparation of a titanium component for polymerization catalysts of the Ziegler-Natta type, wherein (1) in a first stage (1.1) 100 parts by weight of an alcoholate of the general formula Mg(OR)$_2$, where R is alkyl of 1 to 6, preferably 2 to 4, carbon atoms are milled with (1.2) the appropriate number of parts by weight of a chlorotoluene of the formula

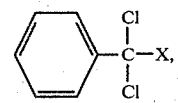

where X is chlorine or hydrogen, preferably the former, to correspond to a molar ratio of alcoholate (1.1): chlorine in the chlorotoluene (1.2) of from 100:1 to 100:100, preferably from 100:3 to 100:30, in a vibratory ball mill under a milling acceleration of from 30 to 80, preferably from 45 to 55, m×sec$^{-2}$, for a period of from 5 to 100, preferably from 10 to 60, hours at from $-50°$ to $+10°$ C., preferably from $-30°$ to $-5°$ C., in the absence of a diluent, thereafter (2) in a second stage (2.1) 100 parts by weight of the material resulting from stage (1) and (2.2) from 300 to 1,800, preferably from 500 to 1,000, parts by weight of titanium tetrachloride are brought together, the batch is kept for from 0.1 to 5, preferably from 0.5 to 2, hours at from 40° to 180° C., preferably from 70° to 90° C., with constant mixing, and the resulting solid is isolated, excess titanium tetrachloride being separated off, and finally (3) in a third stage (3.1) 100 parts by weight of the solid resulting from stage (2) are again brought together with (3.2) from 300 to 1,800, preferably from 500 to 1,000, parts by weight of titanium tetrachloride, the batch is kept for from 0.1 to 5, preferably from 0.5 to 2, hours at from 40° to 180° C., preferably from 120° to 140° C., with constant mixing, and the resulting solid is isolated, excess titanium tetrachloride being separated off.

Regarding the materials used in the novel process, the following should be noted:

Magnesium alcoholates (1.1) of the type suitable for the purposes of the invention are well-known and therefore do not require more detailed discussion. However, it may be mentioned that particularly suitable alcoholates are derived from ethyl alcohol, n-propyl alcohol, i-propyl alcohol, n-butyl alcohol, sec.-butyl alcohol and tert.-butyl alcohol.

The chlorotoluenes (1.2) of the suitable type are also well-known prior art and therefore also do not require more detailed discussion.

The titanium tetrachloride (2.2) or (3.2) which is employed should advantageously be of the type conventionally employed for polymerization catalysts.

The process according to the invention is simple to carry out and those skilled in the art require no explanations to allow them to do so. It should merely be mentioned, as regards stages (2) and (3), that the resulting solid is in each case advantageously isolated by suction filtration, whilst excess titanium tetrachloride is advantageously removed by washing with a liquid hydrocarbon until the latter does not take up any more titanium tetrachloride. The appropriate liquid hydrocarbon for this purpose can be of the type which is conventionally brought into contact with titanium components for catalysts of the Ziegler-Natta type without detriment to the catalyst or to its titanium component, for example when carrying out the polymerization of α-monoolefins. Examples of suitable hydrocarbons are pentanes, hexanes, heptanes, gasolines and cyclohexane.

The titanium components, prepared by the process according to the invention, for polymerization catalysts of the Ziegler-Natta type can be employed in the polymerization of α-olefins in the relevant conventional manner, ie. these titanium components are in general used together with an organo-metallic activator, especially with aluminum-alkyls of the formula Al(alkyl)$_3$ or ClAl(alkyl)$_2$, where alkyl is of 1 to 8 carbon atoms, and especially with triethyl-aluminum or diethyl-aluminum chloride.

As has been found, it is often advantageous to use the novel titanium components, in the polymerization, not only together with activators of the above type but also with relevant conventional promoters. In this context, esters of $C_1$-$C_4$-alkanols with p-alkyl- or, preferably, p-alkoxy-benzoic acids, where alkyl and alkoxy are of 1 to 4 carbon atoms, have proved particularly suitable; a typical example is ethyl anisate.

The titanium components prepared according to the process of the invention give particularly good results in the dry-phase polymerization of α-olefins, ie. polymerization in the absence of liquid auxiliary media; however, they also permit successful polymerization in the presence of liquid auxiliary media. The molecular weight can be varied with the conventional regulators, especially hydrogen. Particularly suitable α-olefins to be polymerized with the catalysts according to the invention are those of 2 to 6 carbon atoms, especially propylene, but-1-ene and 4-methylpent-1-ene and, in the case of copolymerizations, ethylene.

EXAMPLE 1

(A) Preparation of the titanium component of the polymerization catalyst (1) In the first stage,
(1.1) 100 parts by weight of magnesium ethylate, Mg(OC$_2$H$_5$)$_2$, are milled with
(1.2) the appropriate number of parts by weight of benzotrichloride which correspond to a molar ratio of alcoholate (1.1):chlorine in the benzotrichloride (1.2) of 100:16.7, in a vibratory ball mill, under a milling acceleration of 50 m×sec$^{-2}$ for a period of 30 hours at −20° C. in the absence of a diluent.

(2) In the second stage,
(2.1) 100 parts by weight of the material resulting from stage (1) are brought together with
(2.2) 750 parts by weight of titanium tetrachloride and the batch is kept at from 80° to 85° C. for 1 hour, with constant stirring. The resulting solid is then isolated by filtering off, and washing with n-heptane, the washing being continued until titanium tetrachloride is no longer detectable in the filtrate.

(3) In the third stage
(3.1) 100 parts by weight of the solid resulting from stage (2) are again brought together with
(3.2) 750 parts by weight of titanium tetrachloride and the batch is kept at from 128° to 132° C. for 1 hour, with constant stirring. The resulting solid is then isolated by filtering off, and washing with n-heptane, the washing being continued until titanium tetrachloride is no longer detectable in the filtrate.

This gives a titanium component which has a titanium content of about 6 percent by weight, a chlorine content of about 60 percent by weight and a magnesium content of about 20 percent by weight.

(B) Polymerization, using the titanium component.

A stirred vessel is charged with 500 ml of n-heptane, 0.4 g of the titanium component, 10 mmoles of triethylaluminum and 2 mmoles of ethyl anisate (as a promoter).

The actual polymerization is carried out for 3 hours at 60° C. with constant stirring, using propylene as the monomer, the propylene pressure being kept constant at 1 bar during the polymerization.

The polymer is thereby obtained in a yield of 366 g of polypropylene per g of titanium component; the polymer contains 10.3% of components soluble in boiling n-heptane.

EXAMPLE 2

(A) Preparation of the titanium component of the polymerization catalyst.

(1) In the first stage
(1.1) 100 parts by weight of magnesium ethylate, Mg(OC$_2$H$_5$)$_2$, are milled with
(1.2) the appropriate number of parts by weight of benzal chloride which correspond to a molar ratio of alcoholate (1.1):chlorine in the benzal chloride (1.2) of 100:16.7, in a vibratory ball mill, under a milling acceleration of 50 m×sec$^{-2}$ for a period of 30 hours at −20° C. in the absence of a diluent.

(2) In the second stage,
(2.1) 100 parts by weight of the material resulting from stage (1) are brought together with
(2.2) 600 parts by weight of titanium tetrachloride and the batch is kept at from 75° to 80° C. for 1 hour, with constant stirring. The resulting solid is then isolated by filtering off, and washing with n-heptane, the washing being continued until titanium tetrachloride is no longer detectable in the filtrate.

(3) In the third stage
(3.1) 100 parts by weight of the solid resulting from stage (2) are again brought together with
(3.2) 600 parts by weight of titanium tetrachloride and the batch is kept at from 128° to 132° C. for 1 hour, with constant stirring. The resulting solid is then isolated by filtering off, and washing with n-heptane, the washing being continued until titanium tetrachloride is no longer detectable in the filtrate.

This gives a titanium component which has a titanium content of about 5 percent by weight, a chlorine content of about 58 percent by weight and a magnesium content of about 20 percent by weight.

(B) Polymerization, using the titanium component.

A stirred vessel is charged with 500 ml of n-heptane, 0.4 g of the titanium component, 10 mmoles of triethylaluminum and 2 mmoles of ethyl anisate (as a promoter).

The actual polymerization is carried out for 3 hours at 60° C. with constant stirring, using propylene as the monomer, the propylene pressure being kept constant at 1 bar during the polymerization.

The polymer is thereby obtained in a yield of 295 g of polypropylene per g of titanium component; the polymer contains 19.3% of components soluble in boiling n-heptane.

I claim:

1. A process for the preparation of a titanium component for polymerization catalysts of the Ziegler-Natta type, wherein
(1) in a first stage
   (1.1) 100 parts by weight of an alcoholate of the general formula Mg(OR)$_2$, where R is alkyl of 1 to 6 carbon atoms, are milled with
   (1.2) the appropriate number of parts by weight of a chlorotoluene of the formula

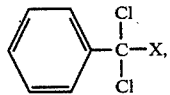

where X is chlorine or hydrogen, to correspond to a molar ratio of alcoholate (1.1):chlorine in the chlorotoluene (1.2) of from 100:1 to 100:100 in a vibratory ball mill under a milling acceleration of from 30 to 80 m×sec$^{-2}$ for a period of from 5 to 100 hours at from $-50°$ to $+10°$ C. in the absence of a diluent, thereafter
(2) in a second stage
   (2.1) 100 parts by weight of the material resulting from stage (1) and
   (2.2) from 300 to 1,800 parts by weight of titanium tetrachloride are brought together, the batch is kept for from 0.1 to 5 hours at from 40° to 180° C., with constant mixing, and the resulting solid is isolated, excess titanium tetrachloride being separated off, and finally
(3) in a third stage
   (3.1) 100 parts by weight of the solid resulting from stage (2) are again brought together with
   (3.2) from 300 to 1,800 parts by weight of titanium tetrachloride, the batch is kept for from 0.1 to 5 hours at from 40 to 180° C., with constant mixing, and the resulting solid is isolated, excess titanium tetrachloride being separated off.